US012741501B2

(12) United States Patent
Xiao et al.

(10) Patent No.: US 12,741,501 B2
(45) Date of Patent: Sep. 22, 2026

(54) THERMAL MANAGEMENT PIPELINE SYSTEM FOR A VEHICLE, THERMAL MANAGEMENT CONTROL METHOD, DEVICE AND VEHICLE

(71) Applicant: JIANGSU XCMG CONSTRUCTION MACHINERY RESEARCH INSTITUTE LTD., Xuzhou (CN)

(72) Inventors: Penghui Xiao, Xuzhou (CN); Mingxing Mao, Xuzhou (CN); Liang Li, Xuzhou (CN)

(73) Assignee: JIANGSU XCMG CONSTRUCTION MACHINERY RESEARCH INSTITUTE LTD., Xuzhou (CN)

( * ) Notice: Subject to any disclaimer, the term of this patent is extended or adjusted under 35 U.S.C. 154(b) by 155 days.

(21) Appl. No.: 18/842,700

(22) PCT Filed: Apr. 19, 2024

(86) PCT No.: PCT/CN2024/088749
§ 371 (c)(1),
(2) Date: Aug. 29, 2024

(87) PCT Pub. No.: WO2025/118459
PCT Pub. Date: Jun. 12, 2025

(65) Prior Publication Data

US 2026/0166942 A1 Jun. 18, 2026

(30) Foreign Application Priority Data

Dec. 8, 2023 (CN) ........................ 202311687369.X

(51) Int. Cl.
*B60H 1/00* (2006.01)

(52) U.S. Cl.
CPC ..... *B60H 1/00278* (2013.01); *B60H 1/00921* (2013.01); *B60H 2001/00307* (2013.01);
(Continued)

(58) Field of Classification Search
CPC ............ B60H 1/00278; B60H 1/00921; B60H 2001/00307; B60H 2001/00949; B60H 2001/00957
See application file for complete search history.

(56) References Cited

U.S. PATENT DOCUMENTS

2019/0047369 A1 2/2019 Kim
2020/0079177 A1 3/2020 Ferraris et al.
(Continued)

FOREIGN PATENT DOCUMENTS

CN 101628545 A 1/2010
CN 109927509 A 6/2019
(Continued)

OTHER PUBLICATIONS

"International Search Report and Written Opinion of the International Searching Authority", International Application No. PCT/CN2024/088749, Aug. 17, 2024, 18 pp.
(Continued)

*Primary Examiner* — Kun Kai Ma
(74) *Attorney, Agent, or Firm* — Myers Bigel, P.A.

(57) ABSTRACT

A thermal management pipeline system for a vehicle includes a first refrigerant circulating pipeline configured for cooling or heating a driver cab of the vehicle in a thermal management mode for the driver cab; a second refrigerant circulating pipeline configured for cooling or heating a battery by using cooling capacity or heat obtained from the first refrigerant circulating pipeline in a thermal management mode for the battery, and further configured for cooling the battery of the vehicle by using a refrigerant flowing into the second refrigerant circulating pipeline from a third refrigerant circulating pipeline in a thermal management mode for a waste heat utilization. The third refrigerant circulating pipeline is configured for cooling an electric
(Continued)

drive system of the vehicle in a thermal management mode for the electric drive system.

16 Claims, 6 Drawing Sheets

(52) U.S. Cl.
CPC .............. *B60H 2001/00949* (2013.01); *B60H 2001/00957* (2013.01)

(56) References Cited

U.S. PATENT DOCUMENTS

| | | | | |
|---|---|---|---|---|
| 2022/0088990 | A1* | 3/2022 | Kim | B60H 1/00278 |
| 2022/0088991 | A1* | 3/2022 | Kim | B60H 1/03 |
| 2022/0212517 | A1* | 7/2022 | Yu | B60H 1/00392 |
| 2023/0158858 | A1* | 5/2023 | Kim | B60H 1/00764 62/186 |
| 2023/0173883 | A1 | 6/2023 | Jeong et al. | |

FOREIGN PATENT DOCUMENTS

| | | | | | |
|---|---|---|---|---|---|
| CN | 110435390 | A | | 11/2019 | |
| CN | 110588279 | A | | 12/2019 | |
| CN | 111619311 | A | | 9/2020 | |
| CN | 112046241 | A | * | 12/2020 | H01M 10/63 |
| CN | 112319181 | A | | 2/2021 | |
| CN | 112389162 | A | | 2/2021 | |
| CN | 113511043 | A | * | 10/2021 | B60H 1/00485 |
| CN | 113619355 | A | * | 11/2021 | B60H 1/143 |
| CN | 113682107 | A | | 11/2021 | |
| CN | 114312205 | A | | 4/2022 | |
| CN | 114801643 | A | | 7/2022 | |
| CN | 114987138 | A | * | 9/2022 | B60H 1/2215 |
| CN | 115675013 | A | | 2/2023 | |
| CN | 115848089 | A | | 3/2023 | |
| CN | 116278596 | A | * | 6/2023 | B60H 1/00271 |
| CN | 116533714 | A | | 8/2023 | |
| CN | 116653543 | A | | 8/2023 | |
| CN | 117533084 | A | | 2/2024 | |
| DE | 102016121362 | A1 | * | 5/2018 | B60H 1/00278 |
| DE | 102020119813 | A1 | | 2/2022 | |
| WO | 2023197652 | A1 | | 10/2023 | |
| WO | 2023207583 | A1 | | 11/2023 | |

OTHER PUBLICATIONS

"Communication with Supplementary European Search Report", EP Application No. 24764736.5, Dec. 15, 2025, 12 pp.

First Office Action and English language translation, CN Application No. 202311687369.X, May 21, 2026, 18 pp.

* cited by examiner determining a component to be controlled of at least one refrigerant circulating pipeline in the thermal management pipeline system for the vehicle, according to the thermal management mode for the vehicle

S310 sending a control signal to the component to be controlled of the at least one refrigerant circulating pipeline to switch the at least one refrigerant circulating pipeline to a state corresponding to the thermal management mode

THERMAL MANAGEMENT PIPELINE SYSTEM FOR A VEHICLE, THERMAL MANAGEMENT CONTROL METHOD, DEVICE AND VEHICLE

CROSS-REFERENCE TO RELATED APPLICATIONS

The present application is a U.S. National Stage Application under 35 U.S.C. § 371 of International Patent Application No. PCT/CN2024/088749, filed on Apr. 19, 2024, which itself claims priority to Chinese application for application No. 202311687369.X, filed on Dec. 8, 2023, the disclosures of which are incorporated herein by reference in their entireties.

TECHNICAL FIELD

The present disclosure relates to the technical field of vehicle thermal management, in particular to a thermal management pipeline system for a vehicle, thermal management control method, device and vehicle.

BACKGROUND

With arrival of the new energy era, development of new energy vehicles is more and more rapid. Thermal management system, as an important part of a new energy vehicle, on one hand, makes key components such as a motor and a power battery work in a suitable temperature range, and improves safety and service life of the vehicle; on another hand, meets the comfort requirements such as heating and cooling of driver cab.

In the related art, separate thermal management systems are provided to control the temperature of individual components.

SUMMARY OF THE INVENTION

According to a first aspect of the present disclosure, there is provided a thermal management pipeline system for a vehicle, comprising: a first refrigerant circulating pipeline configured for cooling or heating a driver cab of the vehicle in a thermal management mode for the driver cab; a second refrigerant circulating pipeline configured for cooling or heating a battery of the vehicle by using cooling capacity or heat obtained from the first refrigerant circulating pipeline in a thermal management mode for the battery, and further configured for cooling the battery of the vehicle by using a refrigerant flowing into the second refrigerant circulating pipeline from a third refrigerant circulating pipeline in a thermal management mode for waste heat utilization; and the third refrigerant circulating pipeline configured for cooling an electric drive system of the vehicle in a thermal management mode for the electric drive system.

In some embodiments, the thermal management mode for the driver cab comprises a cooling mode for the driver cab and a heating mode for the driver cab, and the first refrigerant circulating pipeline comprises a first three-way valve and a second three-way valve, configured to be set to a first open state to communicate with a cooling pipeline in the first refrigerant circulating pipeline in the cooling mode for the driver cab, and further configured to be set to a second open state to communicate with a heating pipeline in the first refrigerant circulating pipeline in the heating mode for the driver cab.

In some embodiments, the cooling pipeline in the first refrigerant circulating pipeline comprises a first sub-pipeline comprising a compressor, the second three-way valve, a first heat exchanger, the first three-way valve, a regenerator, a first electronic expansion valve, a third electromagnetic valve, a cold air core, and a gas-liquid separator which are connected sequentially, wherein the gas-liquid separator is further connected to the compressor; and a second sub-pipeline comprising the first three-way valve, a second electronic expansion valve, the regenerator and the compressor which connected sequentially, wherein the first electronic expansion valve and the second electronic expansion valve are in a throttling state in the cooling mode for the driver cab, and the third electromagnetic valve is in an open state in the cooling mode for the driver cab.

In some embodiments, the heating pipeline in the first refrigerant circulating pipeline comprises a third sub-pipeline comprising a compressor, the second three-way valve, a hot air core, a first electromagnetic valve, a regenerator, a first electronic expansion valve, the first three-way valve, a first heat exchanger, a second electromagnetic valve, and a gas-liquid separator which are connected sequentially; and a fourth sub-pipeline comprising the first electromagnetic valve, a second electronic expansion valve, the regenerator and the compressor which are connected sequentially, wherein the first electromagnetic valve and the second electromagnetic valve are in an open state in the heating mode for the driver cab, and the first electronic expansion valve and the second electronic expansion valve are in a throttling state in the heating mode for the driver cab.

In some embodiments, the thermal management mode for the battery comprises a cooling mode for the battery and a heating mode for the battery, and the second refrigerant circulating pipeline comprises a second heat exchanger connected to the cooling pipeline of the first refrigerant circulating pipeline through a first branch, and connected to the heating pipeline of the first refrigerant circulating pipeline through a second branch, configured for transferring cooling capacity in the cooling pipeline to the second refrigerant circulating pipeline to cool the battery in the cooling mode for the battery, and further configured for transferring heat in the heating pipeline to the second refrigerant circulating pipeline to heat the battery in the heating mode for the battery.

In some embodiments, the first branch comprises a third electronic expansion valve and a fourth electromagnetic valve; the third electronic expansion valve having a first end connected to the cold air core, and the third electronic expansion valve having a second end connected to the second heat exchanger, wherein the third electronic expansion valve is in a throttling state in the cooling mode for the battery; the fourth electromagnetic valve having a first end connected to the cold air core, and the fourth electromagnetic valve having a second end connected to the second heat exchanger, wherein the fourth electromagnetic valve is in an open state in the cooling mode for the battery.

In some embodiments, the second branch comprises a first connecting pipeline arranged between the second three-way valve and the second heat exchanger.

In some embodiments, the second branch further comprises a second connecting pipeline arranged between the second heat exchanger and the hot air core, and the second connecting pipeline comprises a third electronic expansion valve and a fifth electromagnetic valve, wherein the third electronic expansion valve is in a throttling state in the heating mode for the battery, and the fifth electromagnetic valve is in an open state in the heating mode for the battery.

In some embodiments, the second refrigerant circulating pipeline further comprises a first water pump; an electric heater; a third three-way valve, configured to be set to a third open state in the thermal management mode for the waste heat utilization, to make the second refrigerant circulating pipeline communicate with the third refrigerant circulating pipeline and cool the battery by using the refrigerant in the third refrigerant circulating pipeline, and further configured to be set to a fourth open state to make the second refrigerant circulating pipeline not communicate with the third refrigerant circulating pipeline in the thermal management mode for the battery.

In some embodiments, the refrigerant in the first refrigerant circulating pipeline is a carbon dioxide refrigerant.

In some embodiments, the refrigerant in the second refrigerant circulating pipeline and the third refrigerant circulating pipeline is a glycol solution.

According to a second aspect of the present disclosure, there is provided a thermal management control method for a vehicle applied to the thermal management pipeline system for the vehicle as mentioned above, comprising: determining a component to be controlled of at least one refrigerant circulating pipeline in the thermal management pipeline system for the vehicle according to the thermal management mode for the vehicle; sending a control signal to the component to be controlled of the at least one refrigerant circulating pipeline to switch the at least one refrigerant circulating pipeline to a state corresponding to the thermal management mode.

According to a third aspect of the present disclosure, there is provided a thermal management control device for a vehicle applied to the thermal management pipeline system for the vehicle as mentioned above, comprising: a determining module configured for determining a component to be controlled of at least one refrigerant circulating pipeline in the thermal management pipeline system for the vehicle according to the thermal management mode for the vehicle; a sending module configured for sending a control signal to the component to be controlled of the at least one refrigerant circulating pipeline to switch the at least one refrigerant circulating pipeline to a state corresponding to the thermal management mode.

According to a fourth aspect of the present disclosure, there is provided a vehicle, comprising a thermal management pipeline system for the vehicle as mentioned above; the thermal management control device for the vehicle as mentioned above.

According to a fifth aspect of the present disclosure, there is provided a computer-readable storage medium, on which a computer program instruction is stored, and the computer program instruction, when executed by a processor, implements the thermal management control method for the vehicle as mentioned above.

By means of the detailed description below of exemplary embodiments of the present disclosure with reference to the drawing attached thereto, further features and advantages of the present disclosure will become clearer.

BRIEF DESCRIPTION OF THE DRAWINGS

The accompanying drawings, which form part of the description, illustrate embodiments of the present disclosure and together with the description, serve to explain principles of the present disclosure.

The present disclosure can be more clearly understood from the following detailed description with reference to the accompanying drawings.

FIG. 3 is a flowchart of a thermal management control method for a vehicle according to some embodiments of the present disclosure.

DETAILED DESCRIPTION

Figure 1:
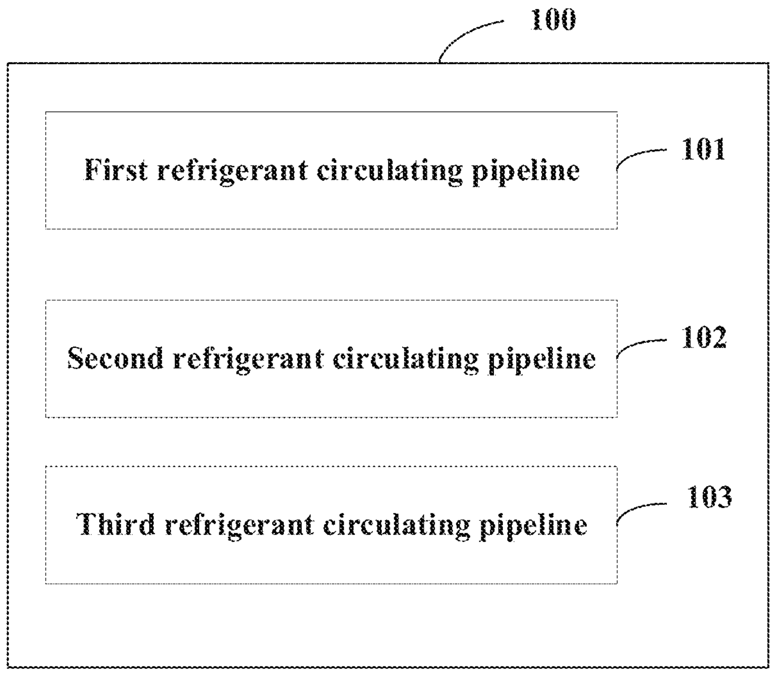
FIG. 1 is a schematic structural diagram of a thermal management pipeline system for a vehicle according to some embodiments of the present disclosure.

Various exemplary embodiments of the present disclosure will now be described in detail with reference to the accompanying drawings. It should be noted that, unless otherwise specified, elements and arrangement of steps relative to one another, numeric expressions and values recited in these embodiments do not restrict the scope of the present disclosure.

Besides, it should be understood that, in order to facilitate illustration, dimensions of elements shown in the drawings are not given according to the actual scaling relation.

The below description of at least one exemplary embodiment is actually only illustrative, and should by no means be taken as any restriction over the present disclosure and its application or use.

For technology, process and apparatus already known by a person skilled in the related art, detailed discussion may not be given, but if appropriate, such technology, process and apparatus should be regarded as part of the description.

In any example shown or discussed here, any specific value should be interpreted only as being exemplary, rather than being restrictive. Thus, other examples of exemplary embodiments may have different values.

It should be noted that, as like reference signs in the below figures denote like elements, once an element is defined in a figure, it does not need to make further discussion for it in a subsequent figure.

In order to make the objective, technical solution and advantages of the present disclosure more clear, the present disclosure will be further described in detail with reference to specific embodiments and drawings.

In the related art, separate thermal management systems are provided to control the temperature of individual components, which has high energy consumption and insufficient energy utilization, and cannot meet the current requirements of whole vehicle thermal management.

In view of this, the present disclosure provides a thermal management pipeline system for a vehicle, a thermal management control method for a vehicle, a thermal management control device for a vehicle and a vehicle. By adopting the design of a centralized pipeline system including a first refrigerant circulating pipeline, a second refrigerant circulating pipeline and a third refrigerant circulating pipeline, and when cooling or heating a battery, adopting indirect cooling or heating based on the first refrigerant circulating pipeline, combined with electric drive system waste heat recovery technology, energy utilization rate of the whole vehicle can be improved, and the pipeline design is more efficient and convenient compared with a distributed thermal management system.

FIG. 1 is a schematic structural diagram of a thermal management pipeline system for a vehicle according to some embodiments of the present disclosure. As shown in FIG. 1, a thermal management pipeline system for a vehicle 100 comprises a first refrigerant circulating pipeline 101, a second refrigerant circulating pipeline 102, and a third refrigerant circulating pipeline 103.

The first refrigerant circulating pipeline 101 is configured for cooling or heating a driver cab of a vehicle in a thermal management mode for the driver cab.

In some embodiments, the thermal management mode for the driver cab comprises a cooling mode for the driver cab and a heating mode for the driver cab, and the first refrigerant circulating pipeline comprises a first three-way valve and a second three-way valve. The first three-way valve and the second three-way valve are configured to be set to a first open state to communicate a cooling pipeline in the first refrigerant circulating pipeline in the cooling mode for the driver cab, and are further configured to be set to a second open state to communicate a heating pipeline in the first refrigerant circulating pipeline in the heating mode for the driver cab.

In some examples, the first open state is a horizontal angle direction open state and the second open state is a vertical angle direction open state.

In some other examples, the first open state is a vertical angle direction open state and the second open state is a horizontal angle direction open state.

In the embodiment of the present disclosure, by arranging two three-way valves in the first refrigerant circulating pipeline and controlling the open state of the two three-way valves to open the cooling pipeline or the heating pipeline, the reliability of the thermal management control for the vehicle can be improved, as compared with switching between cooling and heating through a traditional four-way valve configuration.

In Some embodiments, the refrigerant in the first refrigerant circulating pipeline is carbon dioxide. Since ozone depletion potential of carbon dioxide is zero, using carbon dioxide as a refrigerant has no damage to the atmospheric ozone layer. Further, since the global warming potential of carbon dioxide is 1, as compared with the commonly used refrigerant R134a (R134a has a global warming potential of 1350), its leakage has little impact on the environment, so that the global greenhouse effect can be reduced by using carbon dioxide as a refrigerant. Moreover, carbon dioxide is widely available and does not need to be recovered, which can greatly reduce the replacement cost of refrigerant.

In some embodiments, the cooling pipeline in the first refrigerant circulating pipeline 101 comprises a first sub-pipeline and a second sub-pipeline.

In some examples, the first sub-pipeline comprises a compressor, a second three-way valve, a first heat exchanger (also called external heat exchanger), a first three-way valve, a regenerator, a first electronic expansion valve, a third electromagnetic valve, a cold air core, and a gas-liquid separator which are connected sequentially, wherein the gas-liquid separator is further connected to the compressor; the second sub-pipeline comprises the first three-way valve, a second electronic expansion valve, the regenerator and the compressor which are connected sequentially, wherein the first electronic expansion valve and the second electronic expansion valve are in a throttling state in the cooling mode for the driver cab, and the third electromagnetic valve is in an open state in the cooling mode for the driver cab.

In some of the above examples, the refrigerant (for example, carbon dioxide) is compressed by the compressor to form a high-temperature and high-pressure gas, and then enters the first heat exchanger to dissipate heat to the environment and becomes a medium-temperature and high-pressure supercritical gas, and then is divided into two streams: one stream is partially throttled to an intermediate pressure state through the second electronic expansion valve, and then enters the regenerator for heat exchange, and then is injected into the compressor through an air supply port; the other stream, after passing through the regenerator, is wholly throttled by the first electronic expansion valve, then enters the cold air core to evaporate and absorb heat and flows out, and then enters the gas-liquid separator. Here, the air flows through the cold air core by forced convection through an internal fan, and becomes low-temperature air to flow into the driver cab, thus cooling the driver cab. Gaseous refrigerant flowing out from the gas-liquid separator enters the compressor. After a primary compression by the compressor, this part of the refrigerant is mixed with the gaseous refrigerant entering from the air supply port, and after completion of a secondary compression, it becomes a gaseous refrigerant having a high temperature and a high pressure.

In the embodiment of the present disclosure, the cooling pipeline of the first refrigerant circulating pipeline is designed with double branches, which is helpful to increase the cooling capacity of the system and further improve the operation efficiency of the cooling system. The first refrigerant circulating pipeline designed in the manner as mentioned above (also called heat pump air conditioning system) has a good low-temperature start-up heating function, and can still provide a large heating capacity and maintain a high coefficient of performance in air conditioning under an extremely low outdoor temperature.

In some embodiments, the heating pipeline of the first refrigerant circulating pipeline 101 comprises a third sub-pipeline and a fourth sub-pipeline.

In some examples, the third sub-pipeline comprises the compressor, the second three-way valve, a hot air core, a first electromagnetic valve, the regenerator, the first electronic expansion valve, the first three-way valve, the first heat exchanger, a second electromagnetic valve, and the gas-liquid separator which are connected sequentially, wherein the gas-liquid separator is further connected to the compressor; a fourth sub-pipeline comprising the first electromagnetic valve, the second electronic expansion valve, the regenerator and the compressor which are connected Sequentially, wherein the first electromagnetic valve and the second electromagnetic valve are in an open state in the heating mode for the driver cab, and the first electronic expansion valve and the second electronic expansion valve are in a throttling state in the heating mode for the driver cab.

In some of the above examples, the refrigerant (for example, carbon dioxide) is compressed by the compressor to form a high-temperature and high-pressure gas, and then enters the hot air core. The internal fan drives the external air to flow through the hot air core by forced convection, so as to heat the air entering the driver cab to thereby heat the driver cab. Hence the gaseous refrigerant exiting from the hot air core becomes a medium-temperature and high-pressure supercritical gas, and then is divided into two streams: one stream of the gaseous refrigerant is partially throttled to an intermediate pressure state through the second electronic expansion valve, and then enters the regenerator for heat exchange, and then is injected into the compressor through an air supply port; another stream of the gaseous refrigerant, after passing through the regenerator, is wholly throttled by the first electronic expansion valve, then enters the first heat exchanger to evaporate and absorb heat and exits, and then enters the gas-liquid separator. The gaseous refrigerant exiting from the gas-liquid separator enters the compressor, and after a primary compression by the compressor, this part of the gaseous refrigerant is mixed with the gaseous refrigerant entering from the air supply port. After completion of a secondary compression, the mixed refrigerant becomes a gaseous refrigerant in a state of high temperature and high pressure.

In the embodiment of the present disclosure, the heating pipeline of the first refrigerant circulating pipeline is designed with double branches, which is helpful to increase the heating capacity of the system and further, improve the operation efficiency of the heating system. By using a first refrigerant circulating pipeline with the above design, a transcritical heat pump system with air supply and enthalpy increase is realized. Firstly, the use of double-branch design reduces enthalpy at an inlet of the evaporator (such as cold air core and hot air core), thus increasing the enthalpy difference between the inlet and outlet of the evaporator. At the same time, the intermediate air supply process can increase the refrigerant flow through the gas cooler (such as an external heat exchanger), thus improving the heating capacity of the system at low temperature condition and the cooling capacity at high temperature condition. In addition, the air supply branch can effectively lower the exhaust temperature of the compressor, thus avoiding overheating.

The second refrigerant circulating pipeline 102 is configured for cooling or heating a battery of the vehicle by using cold or heat obtained from the first refrigerant circulating pipeline 101 in a thermal management mode for the battery.

In some embodiments, the thermal management mode for the battery comprises a cooling mode for the battery and a heating mode for the battery.

In some examples, the second refrigerant circulating pipeline 102 comprises a second heat exchanger. The second heat exchanger is connected to the cooling pipeline of the first refrigerant circulating pipeline 101 through a first branch, and connected to the heating pipeline of the first refrigerant circulating pipeline 101 through a second branch. The second heat exchanger is configured for transferring cold in the cooling pipeline to the second refrigerant circulating pipeline to cool the battery in the cooling mode for the battery. The second heat exchanger is configured for transferring heat in the heating pipeline to the second refrigerant circulating pipeline to heat the battery in the heating mode for the battery.

In some examples, the first branch comprises a third electronic expansion valve and a fourth electromagnetic valve. The third electronic expansion valve has a first end connected to the cold air core, and the third electronic expansion valve has a second end connected to the second heat exchanger. The third electronic expansion valve is in a throttling state in the cooling mode for the battery. The fourth electromagnetic valve has a first end connected to the cold air core, and the fourth electromagnetic valve has a second end connected to the second heat exchanger. The fourth electromagnetic valve is in an open state in the cooling mode for the battery.

In some of the above examples, in the first refrigerant circulating pipeline, the gaseous refrigerant wholly throttled by the first electronic expansion valve, re-enters the third electronic expansion valve to form a low-temperature and low-pressure state, and then enters the second heat exchanger to transfer the cold to the refrigerant (such as ethylene glycol) in the second refrigerant circulating pipeline. The refrigerant with indirectly transferred cold flows through a liquid cooling sheet of the battery, thereby cooling the battery.

In some examples, the second branch comprises a first connecting pipeline arranged between the second three-way valve and the second heat exchanger.

In some examples, the second branch further comprises a second connecting pipeline arranged between the second heat exchanger and the hot air core. The second connecting pipeline comprises the third electronic expansion valve and a fifth electromagnetic valve. The third electronic expansion valve is in a throttling state in the heating mode for the battery. The fifth electromagnetic valve is in an open state in the heating mode for the battery.

In some of the above examples, in the first refrigerant circulating pipeline, the stream of the refrigerant (such as carbon dioxide) in a high-temperature and high-pressure state formed by compression of the compressor, directly enters the second heat exchanger. Through the second heat exchanger, heat of the refrigerant in the first refrigerant circulating pipeline is transferred to the refrigerant (such as ethylene glycol) in the second refrigerant circulating pipeline. In the second refrigerant circulating pipeline, the refrigerant with indirectly transferred heat flows through the liquid cooling sheet of the battery, thereby heating the battery.

In the embodiment of the present disclosure, the second heat exchanger is used to exchange heat with the cooling pipeline used for cooling the driver cab or the heating pipeline used for heating the driver cab, to indirectly cool or heat the battery, thereby contributing to the improvement of energy utilization efficiency of the whole vehicle, and the design thereof is efficient and convenient. Further, by controlling the valves arranged on the first branch and the second branch, it facilitates switching the cooling pipeline and the heating pipeline efficiently and conveniently.

The second refrigerant circulating pipeline 102 is further configured for cooling the battery of the vehicle by using a refrigerant flowing into the second refrigerant circulating pipeline 102 from a third refrigerant circulating pipeline 103 in a thermal management mode for waste heat utilization.

In some embodiments, the second refrigerant circulating pipeline further comprises a first water pump, an electric heater and a third three-way valve. The first water pump is in an open state in both the cooling mode for the battery and the heating mode for the battery, to drive a flow of the refrigerant in the second refrigerant circulating pipeline. In the heating mode for the battery or waste heat utilization mode, if the temperature rise rate of the battery is too low, the electric heater can be turned on for additional heating.

The third three-way valve is configured to be set to a third open state in the thermal management mode for waste heat utilization, so that the second refrigerant circulating pipeline is communicated with the third refrigerant circulating pipeline to cool the battery with the refrigerant in the third refrigerant circulating pipeline. The third three-way valve is further configured to be set to a fourth open state to disconnect the second refrigerant circulating pipeline from the third refrigerant circulating pipeline in the thermal management mode for the battery.

In the embodiment of the present disclosure, by arranging a third three-way valve, the battery can be heated conveniently and efficiently by using waste heat in the cooling pipeline of the electric drive system, so that energy utilization rate of the whole vehicle system is improved, and energy consumption is reduced. Further, the battery is heated by using heat pump technology combined with electric drive system waste heat utilization technology and auxiliary electric heating means, which greatly enhances thermal efficiency of the thermal management system, improves reliability and stability of the whole thermal management system, and enables the whole vehicle to withstand more complicated and changing work conditions.

The third refrigerant circulating pipeline 103 is configured for cooling an electric drive system of the vehicle in a thermal management mode for the electric drive system.

In some embodiments, core components included in the electric drive system are cooled by water channels connected in series, and a single high-power water pump is provided to drive the refrigerant to flow such that the whole cooling system is simple, reliable and highly adaptable.

In some embodiments, the electric drive system includes a DC-to-DC converter (DCDC), a motor controller, a motor and a charger. The third refrigerant circulating pipeline 103 uses ethylene glycol as refrigerant (or coolant). The third refrigerant circulating pipeline comprises a second water pump, a front heat-dissipation module and an expansion water tank. When in the cooling mode for electric drive system, the second water pump is turned on to drive a flow of the refrigerant in the third refrigerant circulation pipeline 103. When the refrigerant flows into the front heat-dissipation module, the refrigerant exchanges heat indirectly with air driven by forced convection of the external fan, thus lowering the temperature. Thereafter, the refrigerant in the third refrigerant circulating pipeline circulates to the electric drive system to absorb heat, so as to lower the temperature of the electric drive system. By arranging an expansion water tank in the third refrigerant circulating pipeline, the pressure in the third refrigerant circulating pipeline can be communicated with the atmosphere and the refrigerant can be replenished timely and effectively.

In the embodiment of the present disclosure, by adopting the design of a centralized pipeline system including a first refrigerant circulating pipeline, a second refrigerant circulating pipeline and a third refrigerant circulating pipeline, and adopting indirect cooling or heating based on the first refrigerant circulating pipeline, combined with electric drive system waste heat recovery technology to cool or heat a battery, energy utilization rate of the whole vehicle can be improved, and the pipeline design is more efficient and convenient compared with a distributed thermal management system.

Figure 2:
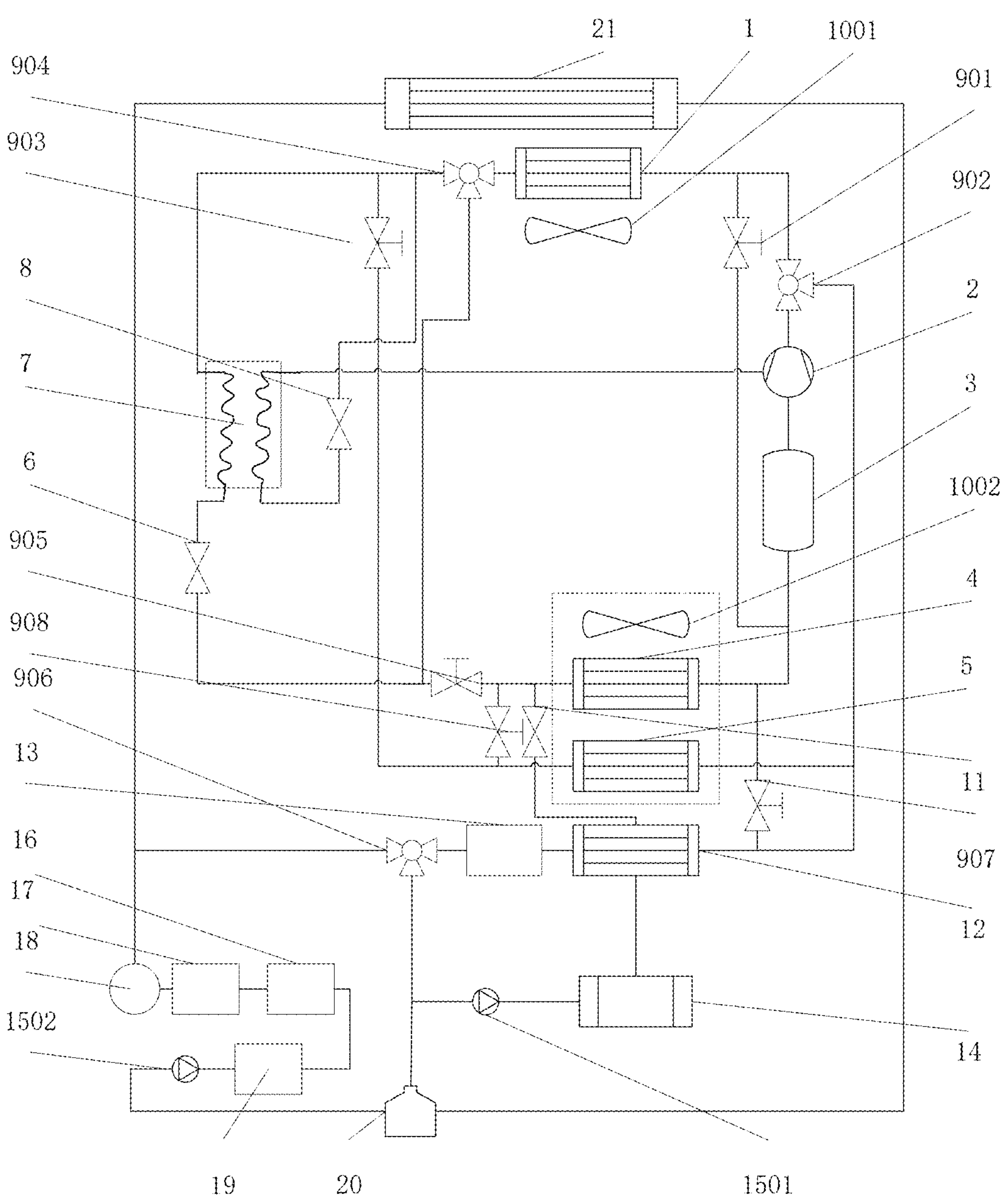
FIG. 2 is a schematic structural diagram of a thermal management pipeline system for a vehicle according to some other embodiments of the present disclosure.

FIG. 2 is a schematic structural diagram of a vehicle thermal management pipeline system according to some other embodiments of the present disclosure. As shown in FIG. 2, a thermal management pipeline system for a vehicle comprises a first refrigerant circulating pipeline, a second refrigerant circulating pipeline, and a third refrigerant circulating pipeline.

The first refrigerant circulating pipeline comprises a cooling pipeline and a heating pipeline. The cooling pipeline comprises a communication loop formed by a compressor 2, a second three-way valve 902, a first heat exchanger (also called an external heat exchanger) 1, a first three-way valve 904, a regenerator 7, a second electronic expansion valve 8, a first electronic expansion valve 6, a third electromagnetic valve 905, a cold air core 4 and a gas-liquid separator 3. When the vehicle is in the cooling mode for the driver cab, the compressor 2 operates normally, the second three-way valve 902 and the first three-way valve 904 are open in a horizontal angle direction, the second electronic expansion valve 8 and the first electronic expansion 6 are in a throttling state, and the third electromagnetic valve 905 is in an open state.

The heating pipeline comprises a communication loop formed by the compressor 2, the second three-way valve 902, an hot air core 5, a first electromagnetic valve 903, the regenerator 7, the second electronic expansion valve 8, the first electronic expansion valve 6, the first three-way valve 904, the first heat exchanger 1, a second electromagnetic valve 901 and the gas-liquid separator 3.

When the vehicle is in the heating mode for the driver cab, the compressor 2 operates normally, the second three-way valve 902 and the first three-way valve 904 are open in a vertical angle direction, the first electromagnetic valve 903 and the second electromagnetic valve 901 are in an open state, the second electronic expansion valve 8 and the first electronic expansion valve 6 are in a throttling state.

The second refrigerant circulating pipeline passing through the battery, comprises a second heat exchanger 12, a third three-way valve 906, a first water pump 1501, and an electric heater 14.

The second heat exchanger 12 is configured for transferring cold in the cooling pipeline of the first refrigerant circulating pipeline to the second refrigerant circulating pipeline. In some examples, the third electronic expansion valve 11, the second heat exchanger 12 and the fourth electromagnetic valve 907 are connected in parallel to the cold air core 4, and are sequentially communicated with the battery 13, the third three-way valve 906, the first water pump 1501 and the electric heater 14. When the vehicle is in the cooling mode for the battery, the fourth electromagnetic valve 907 is in an open state, the third electronic expansion valve 11 is in a throttling state, the third three-way valve 906 is in a vertical angle open state, and the first water pump 1501 is in an open state.

The second heat exchanger 12 is further configured for transferring heat in the heating pipeline of the first refrigerant circulating pipeline to the second refrigerant circulating pipeline. In some examples, the third electronic expansion valve 11, the second heat exchanger 12 and the fifth electromagnetic valve 908 are connected in parallel to the hot air core 5, and are sequentially communicated with the battery 13, the third three-way valve 906, the first water pump 1501 and the electric heater 14. When the vehicle is in the heating mode for the battery, the fifth electromagnetic valve 908 is in an open state, the third electronic expansion valve 11 is in a throttling state, the third three-way valve 906 is in a vertical-angle open state, and the first water pump 1501 is in an open state. If the temperature rise rate of the battery is too low, the electric heater 14 can be turned on for additional heating.

The third refrigerant circulating pipeline passing through the electric drive system, comprises a front heat-dissipation module 21, an expansion water tank 20 and a second water pump 1502 which are connected sequentially.

In some examples, the electric drive system comprises a charger 19, a DCDC 16, a motor controller 17 and a motor 18. When the vehicle is in the cooling mode for the electric drive system, the second water pump 1502 is turned on to drive the refrigerant to flow through the electric drive system, thereby cooling the electric drive system.

In some examples, the third refrigerant circulating pipeline is connected to the second refrigerant circulating pipeline through a third three-way valve. When the vehicle is in the cooling mode for the electric drive system, the third three-way valve is in the vertical-angle open state, to disconnect the third refrigerant circulating pipeline from the second refrigerant circulating pipeline. When the vehicle is in the thermal management mode for waste heat utilization, the third three-way valve 906 is in a horizontal angle direction open state so that the third refrigerant circulating pipeline is communicated with the second refrigerant circulating pipeline to heat the battery with the refrigerant in the third refrigerant circulating pipeline.

In some examples, the third refrigerant circulating pipeline and the second refrigerant circulating pipeline are further connected in parallel to the expansion water tank 20. For example, a pipeline consisting of the first water pump 1501, the electric heater 14, the second heat exchanger 12, the battery 13 and the third three-way valve 906, and a pipeline consisting of the second water pump 1502, the charger 19, the DCDC 16, the motor controller 17 and the motor 18, are connected in parallel at the expansion water tank 20.

In the embodiment of the present disclosure, by adopting the above centralized thermal management pipeline design, energy utilization rate of the whole vehicle can be improved, and the pipeline design thereof is more efficient and convenient than that of a distributed heat management system. As compared to the related art, the present disclosure has advantages as follows.

1. By using heat pump air conditioning technology and electric drive system waste heat recovery technology, energy utilization efficiency of a whole vehicle is improved. The design is efficient and convenient, which is advantageous to realization of a centralized thermal management system of the whole vehicle, avoids redundant design of a distributed thermal management system, and effectively increases the product's market competitiveness.
2. The first refrigerant circulating pipeline (heat pump system) is structured and designed into a "three-heat exchanger" configuration, and two three-way valves are provided to switch between cooling and heating modes, which alleviate the problems of low reliability and single function existing with a traditional four-way valve configuration, have the characteristics of simple valve parts and mature control. In addition, the above pipeline design allows a more convenient and comfortable manner to realize a defrosting mode.
3. Natural working medium $CO_2$ is taken as a refrigerant in the first refrigerant circulating pipeline, which has an Ozone Depression Potential (ODP) of 0 and a Global Warming Potential (GWP) of only 1 such that leakage thereof has little impact on the environment, as compared to a commonly used refrigerant R134a (GWP of which is 1350).
4. The first refrigerant circulating pipeline has a good low-temperature start-up heating function, and can still provide a large heating capacity and maintain a high coefficient of performance (COP) in air conditioning under an extremely low outdoor temperature.
5. The first refrigerant circulating pipeline is designed with double branches, which can reduce enthalpy at an inlet of the evaporator, increasing an enthalpy difference between the inlet and outlet of the evaporator. Meanwhile, the intermediate air supply process can increase the refrigerant flow through the gas cooler, thus improving the heating capacity of the system at low temperature condition and the cooling capacity at high temperature condition. In addition, the refrigerant of intermediate air supply has a temperature lower than a temperature of the refrigerant of primary compression such that the air supply system can effectively lower the exhaust temperature of the compressor, thus avoiding overheating.
6. Battery is heated in such a mode as mainly by heat pump technology combined with electric drive system waste heat utilization technology and assisted by an electric heater, which greatly enhances thermal efficiency of the thermal management system, improves reliability and stability of the whole thermal management system, and enables the whole vehicle to withstand more complicated and changing work conditions.
7. Core components included in the electric drive system are cooled by water channels connected in series, and a single high-power water pump is provided to drive the refrigerant to flow such that the whole cooling system is simple and reliable, and has strong adaptability. Optionally, a heat-dissipation enhancement device can be provided additionally to make the product more competitive in the market.

Figure 3:
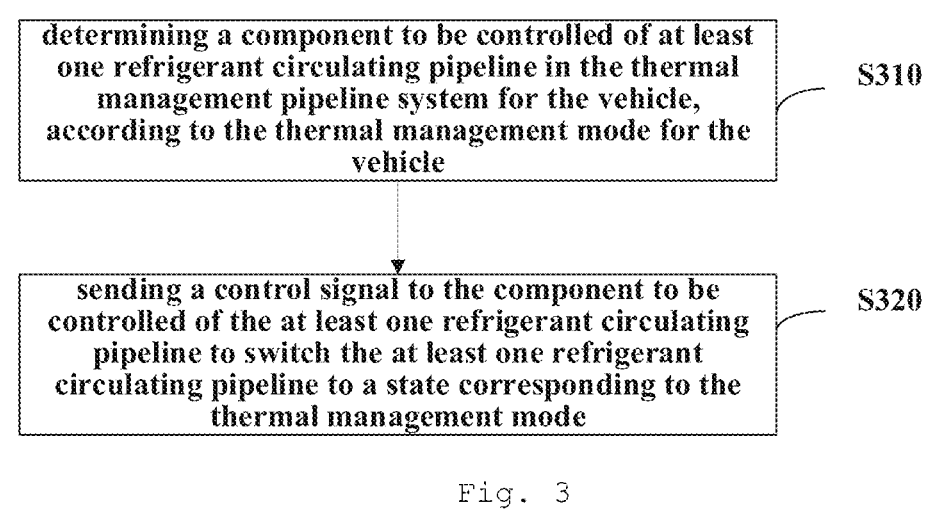

FIG. 3 is a flowchart of a thermal management control method for a vehicle according to some embodiments the present disclosure. As shown in FIG. 3, the thermal management control method for a vehicle comprises step S310 and step S320.

Step S310 comprises determining a component to be controlled of at least one refrigerant circulating pipeline in the thermal management pipeline system for the vehicle, according to the thermal management mode for the vehicle.

In some embodiments, the thermal management control method for the vehicle is implemented by a thermal management control device for the vehicle.

In some embodiments, the thermal management pipeline system for the vehicle comprises, as shown in FIG. 1, a first refrigerant circulating pipeline, a second refrigerant circulating pipeline, and a third refrigerant circulating pipeline.

In some embodiments, the thermal management mode comprises a thermal management mode for a driver cab, a thermal management mode for the battery, a cooling mode for the electric drive system, and a thermal management mode for waste heat utilization.

In some embodiments, the thermal management mode for the driver cab comprises a cooling mode for the driver cab and a heating mode for the driver cab; the thermal management mode for the battery comprises a cooling mode for the battery and a heating mode for the battery.

In some embodiments, when the thermal management mode for the vehicle is the cooling mode for the driver cab or the heating mode for the driver cab, a component of the first refrigerant circulating pipeline is taken as the component to be controlled.

In some embodiments, when the thermal management mode for the vehicle is the cooling mode for the battery or the heating mode for the battery, a component of the first refrigerant circulating pipeline and a component of the second refrigerant circulating pipeline are taken as the component to be controlled.

In some embodiments, when the thermal management mode for the vehicle is the cooling mode for the electric drive system, a component of the third refrigerant circulating pipeline is taken as the component to be controlled.

In some embodiments, when the thermal management mode for the vehicle is the thermal management mode for waste heat utilization, a component of the second refrigerant circulating pipeline and a component of the third refrigerant circulating pipeline are taken as the component to be controlled.

Step S320 comprises sending a control signal to the component to be controlled of the at least one refrigerant circulating pipeline to switch the at least one refrigerant circulating pipeline to a state corresponding to the thermal management mode.

In some embodiments, when the thermal management mode for the vehicle is the cooling mode for the driver cab, a control signal is sent to the component of the first refrigerant circulating pipeline to switch the first refrigerant circulating pipeline to a state corresponding to the cooling mode for the driver cab.

In some embodiments, when the thermal management mode for the vehicle is the heating mode for the driver cab, a control signal is sent to the component of the first refrigerant circulating pipeline to switch the first refrigerant circulating pipeline to a state corresponding to the heating mode for the driver cab.

In some embodiments, when the thermal management mode for the vehicle is the cooling mode for the battery, a control signal is sent to the component of the first refrigerant circulating pipeline and the component of the second refrigerant circulating pipeline to switch the first, second refrigerant circulating pipeline to a state corresponding to the cooling mode for the battery.

In some embodiments, when the thermal management mode for the vehicle is the heating mode for the battery, a control signal is sent to the component of the first refrigerant circulating pipeline and the component of the refrigerant circulating pipeline to switch the first, second refrigerant circulating pipeline to a state corresponding to the heating mode for the battery. Besides, similar control method can be adopted for the electric drive system cooling mode and the waste heat utilization thermal management mode.

In the embodiment of the present disclosure, through centralized control of the first refrigerant circulating pipeline, the second refrigerant circulating pipeline and the third refrigerant circulating pipeline, various thermal management modes can be conveniently and efficiently realized, the energy utilization rate of the whole vehicle system is improved. And pipeline design and pipeline control are more convenient and reliable.

Figure 4:
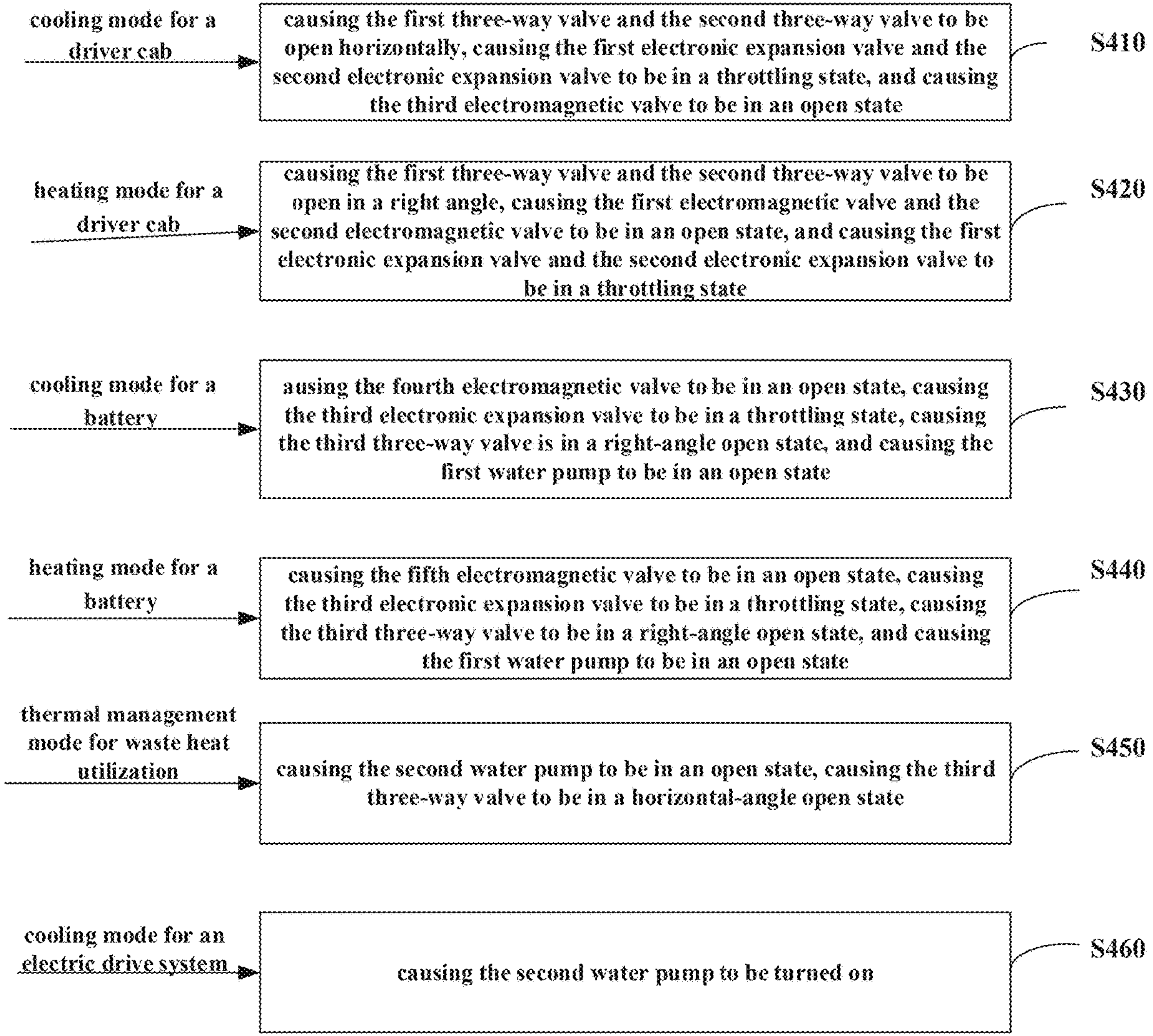
FIG. 4 is a flowchart of a thermal management control method for a vehicle according to some other embodiments of the present disclosure.

FIG. 4 is a flowchart of a thermal management control method for a vehicle according to some other embodiments of the present disclosure. As shown in FIG. 4, based on the pipeline structure shown in FIG. 2, the thermal management control method for the vehicle according to the embodiment of the present disclosure comprises steps S410 to S460.

Step S410 comprises in the cooling mode for the driver cab, causing the first three-way valve and the second three-way valve to be open horizontally, causing the first electronic expansion valve and the second electronic expansion valve to be in a throttling state, and causing the third electromagnetic valve to be in an open state.

In the embodiment of the present disclosure, through step S410, the cooling pipeline in the first refrigerant circulation pipeline can be communicated and the pipeline is in the cooling state.

In the cooling pipeline, the refrigerant (for example, carbon dioxide) is compressed by the compressor to form a gas in a high-temperature and high-pressure state, and then enters the first heat exchanger to dissipate heat to the environment so as to become a supercritical gas having a medium temperature and a high pressure. Thereafter, the refrigerant is divided into two streams: a first stream is partially throttled to an intermediate pressure state through the second electronic expansion valve, and then enters the regenerator for heat exchange, and then is injected into the compressor through an air supply port; a second stream, after passing through the regenerator, is wholly throttled by the first electronic expansion valve, then enters the cold air core to evaporate and absorb heat and exits, and then enters the gas-liquid separator. When the second stream of refrigerant flows through the cold air core, air flows through the cold air core by forced convection through an internal fan, to become low-temperature air to flow into the driver cab, thus cooling the driver cab. Gaseous refrigerant exiting from the gas-liquid separator enters the compressor. After a primary compression by the compressor, this part of the refrigerant is mixed with the gaseous refrigerant entering from the air supply port, and after completion of a secondary compression, it becomes a gaseous refrigerant having a high temperature and a high pressure.

Step S420 comprises in the heating mode for the driver cab, causing the first three-way valve and the second three-way valve to be open in a right angle, causing the first electromagnetic valve and the second electromagnetic valve to be in an open state, and causing the first electronic expansion valve and the second electronic expansion valve to be in a throttling state.

In the embodiment of the present disclosure, through step S420, the heating pipeline in the first refrigerant circulation pipeline can be communicated so that the pipeline is in the heating state.

In the above heating pipeline, the refrigerant (for example, carbon dioxide) is compressed by the compressor to form a gas in a high-temperature and high-pressure state, and then enters the hot air core. Meanwhile, the internal fan drives the external air to flow through the hot air core by forced convection so that the air entering the driver cab is heated by the refrigerant flowing into the hot air core to thereby heat the driver cab. The gaseous refrigerant exiting from the hot air core becomes a medium-temperature and high-pressure supercritical gas, and then is divided into two streams: one stream is partially throttled to an intermediate pressure state through the second electronic expansion valve, and then enters the regenerator for heat exchange, and then is injected into the compressor through an air supply port; another stream, after passing through the regenerator, is wholly throttled by the first electronic expansion valve, then enters the first heat exchanger to evaporate and absorb heat and exits, and then enters the gas-liquid separator. The gaseous refrigerant exiting from the gas-liquid separator enters the compressor, and after a primary compression by the compressor, this part of the gaseous refrigerant is mixed with the gaseous refrigerant entering from the air supply port. After completion of a secondary compression, the mixed refrigerant becomes a gaseous refrigerant in a state of high temperature and high pressure.

Step S430 comprises in the cooling mode for the battery, causing the fourth electromagnetic valve to be in an open state, causing the third electronic expansion valve to be in a throttling state, causing the third three-way valve to be in a right-angle open state, and causing the first water pump to be in an open state.

In the embodiment of the present disclosure, through step S430, the second refrigerant circulating pipeline can be positioned in the cooling state.

In the cooling mode for the battery, in the first refrigerant circulating pipeline, the gaseous refrigerant (such as carbon dioxide) wholly throttled by the first electronic expansion valve, re-enters the third electronic expansion valve to form a low-temperature and low-pressure state, and then enters the second heat exchanger to transfer the cold to the refrigerant (such as ethylene glycol) in the second refrigerant circulating pipeline. In the second refrigerant circulating pipeline, the refrigerant with indirectly transferred cold flows through the liquid cooling sheet of the battery, thereby cooling the battery.

Step S440 comprises in the heating mode for the battery, causing the fifth electromagnetic valve to be in an open state, causing the third electronic expansion valve to be in a throttling state, causing the third three-way valve to be in a right-angle open state, and causing the first water pump to be in an open state.

In the embodiment of the present disclosure, through step S440, the second refrigerant circulating pipeline can be positioned in the heating state.

In the heating mode for the battery, in the first refrigerant circulating pipeline, part of the gaseous refrigerant (such as carbon dioxide) in the state of high temperature and high pressure formed by compression by the compressor, enters the second heat exchanger directly, to transfer the heat of the refrigerant in the first refrigerant circulating pipeline to the refrigerant (such as ethylene glycol) in the second refrigerant circulating pipeline through the second heat exchanger. In the second refrigerant circulating pipeline, the refrigerant with indirectly transferred heat flows through the liquid cooling sheet of the battery, thereby heating the battery.

Step S450 comprises in the thermal management mode for waste heat utilization, causing the second water pump to be in an open state, causing the third three-way valve to be in a horizontal-angle open state.

In the thermal management mode for waste heat utilization, the refrigerant in the third refrigerant circulating pipeline is directed to the second refrigerant circulating pipeline through valve control. Driven by the first water pump, the refrigerant in the second refrigerant circulating pipeline flows through the battery, to heat the battery. If the heating rate of the battery cannot meet the requirement, the electric heater can be turned on for additional heating.

In some embodiments, when the thermal management mode for waste heat utilization is not turned on, the third three-way valve is caused to be in a right-angle open state.

Step S460 comprises causing the second water pump to be turned on, in the cooling mode for the electric drive system.

In the cooling mode for the electric drive system, the second water pump is caused to be turned on, to drive a flow of the refrigerant (such as ethylene glycol solution) in the third refrigerant circulating pipeline. When the refrigerant flows into the front heat-dissipation module, the refrigerant exchange heat indirectly with air driven by forced convection of an external fan, thus lowering the temperature. Thereafter, the refrigerant in the third refrigerant circulating pipeline circulates to the electric drive system to absorb heat, so as to lower the temperature of the electric drive system.

In the embodiment of the present disclosure, by centrally and uniformly controlling the components (such as various valves) in the thermal management pipeline system for the vehicle, various thermal management modes can be conveniently and efficiently realized, the energy utilization rate of the whole vehicle system is improved. And pipeline design and pipeline control are more convenient and reliable.

Figure 5:
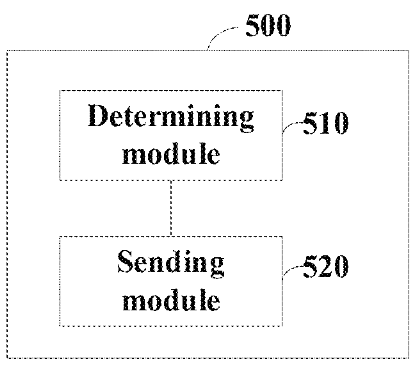
FIG. 5 is a schematic structural block diagram of a thermal management control device for a vehicle according to some embodiments of the present disclosure.

FIG. 5 is a schematic structural block diagram of a thermal management control device for a vehicle according to some embodiments of the present disclosure. As shown in FIG. 5, the thermal management control device for a vehicle 500 comprises a determining module 510 and a sending module 520.

The determining module 510 is configured for determining a component to be controlled of at least one refrigerant circulating pipeline in the thermal management pipeline system for the vehicle, according to the thermal management mode for the vehicle.

The sending module 520 is configured for sending a control signal to the component to be controlled of the at least one refrigerant circulating pipeline to switch the at least one refrigerant circulating pipeline to a state corresponding to the thermal management mode.

In the embodiment of the present disclosure, through the above device, the components in the thermal management pipeline system for the vehicle can be controlled centrally and uniformly such that various thermal management modes can be conveniently and efficiently realized, the energy utilization rate of the whole vehicle system is improved. And pipeline design and pipeline control are more convenient and reliable.

Figure 6:
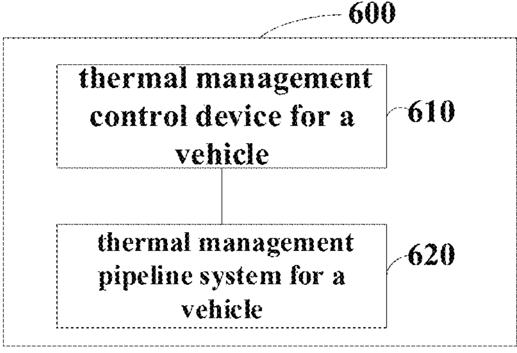
FIG. 6 is a schematic structural block diagram of a vehicle according to some embodiments of the present disclosure.

FIG. 6 is a schematic structural block diagram of a vehicle according to some embodiments of the present disclosure. As shown in FIG. 6, the vehicle according to the embodiment of the present disclosure comprises a thermal management pipeline system for a vehicle 610 and a thermal management control device for a vehicle 620.

The thermal management pipeline system for the vehicle 610 adopts a pipeline structure as shown in FIG. 1 or FIG. 2.

The thermal management control device for the vehicle 620 adopts a composition structure as shown in FIG. 5.

In the embodiment of the present disclosure, through the above vehicle, a centralized thermal management system is realized, such that energy utilization rate of the whole vehicle can be improved, and the pipeline design thereof is more efficient and convenient than that of a distributed heat management system.

Figure 7:
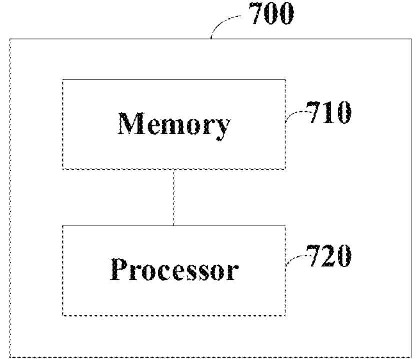
FIG. 7 is a schematic structural diagram of a thermal management control device for a vehicle according to some other embodiments of the present disclosure.

FIG. 7 is a schematic structural diagram of a vehicle thermal management control device according to some other embodiments of the present disclosure.

As shown in FIG. 7, a thermal management control device for a vehicle 700 comprises a memory 710 and a processor 720 coupled to the memory 710. The memory 710 is configured to store instructions for executing embodiments corresponding to the thermal management control method for the vehicle. The processor 720 is configured to execute the thermal management control method for the vehicle in any of the embodiments of the present disclosure based on instructions stored in the memory 710.

Figure 8:
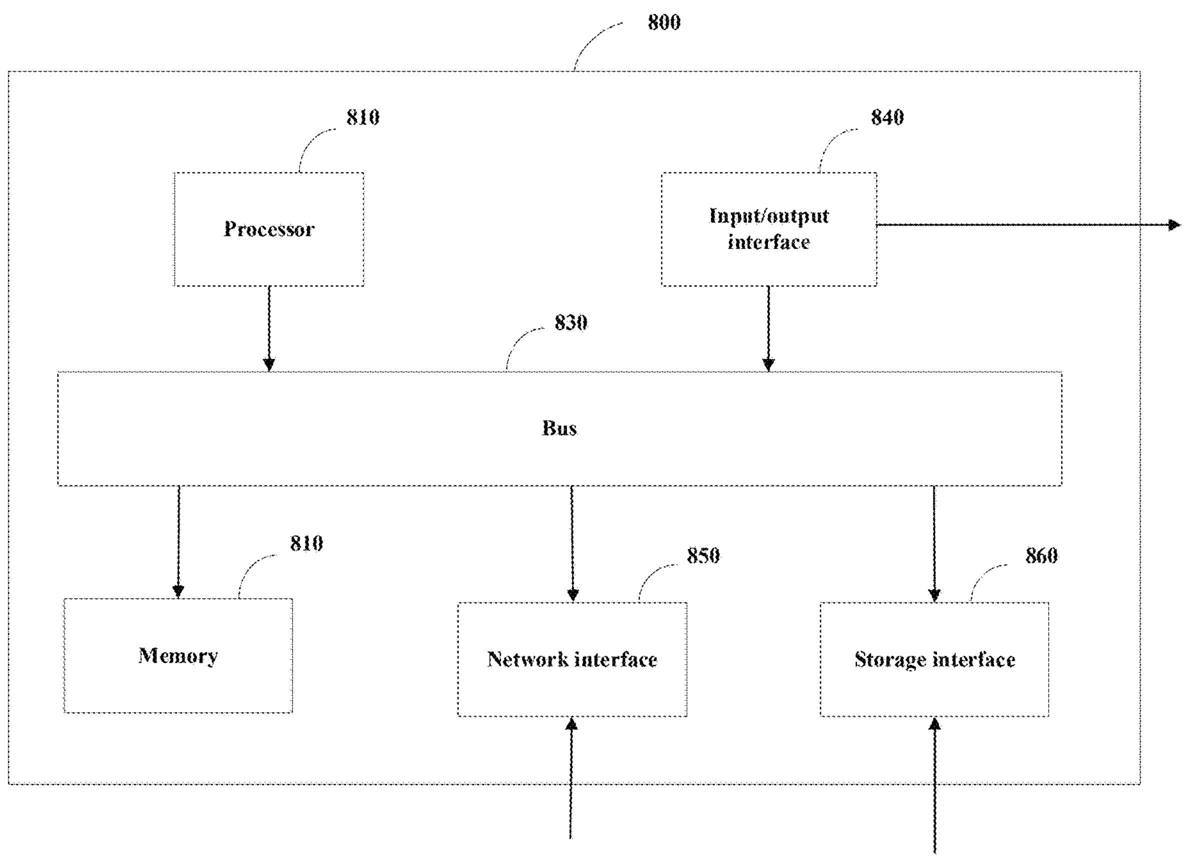
FIG. 8 is a schematic structural diagram of a computer system according to some embodiments of the present disclosure.

FIG. 8 is a schematic structural diagram of a computer system according to some embodiments of the present disclosure.

As shown in FIG. 8, the computer system 800 can be represented in the form of a general-purpose computing device. The computer system 800 comprises a memory 810, a processor 820 and a bus 830 connecting different system components.

The memory 810 comprises, for example, a system memory, a nonvolatile storage medium, and the like. The system memory stores, for example, an operating system, an application program, a Boot Loader program and other programs. The system memory may comprise volatile storage media such as a random access memory (RAM) and/or a cache memory. The nonvolatile storage medium stores, for example, instructions of at least one embodiment corresponding to the thermal management control method for the vehicle that is being executed. A non-volatile storage medium includes, but is not limited to, a disk storage, an optical storage, a flash memory, or the like.

The processor 820 can be realized in the form of a general processor, a digital signal processor (DSP), an application specific integrated circuit (ASIC), a field programmable gate array (FPGA) or any other programmable logic device, a discrete hardware component such as discrete gate or transistor. Accordingly, each module, such as the determining module and the sending module, can be realized by a central processing unit (CPU) running an instruction to execute corresponding steps in a memory, or by a dedicated circuit to execute corresponding steps.

The bus 830 may use any of a variety of bus structures. For example, the bus structure includes, but is not limited to, an Industry Standard Architecture (ISA) bus, a Microchannel Architecture (MCA) bus and a Peripheral Component Interconnection (PCI) bus.

These interfaces 840, 850, 860 and the memory 810 and the processor 820 of the computer system 800 can be connected through the bus 830. The input/output interface 840 can provide a connection interface for an input/output device such as a display, a mouse and a keyboard. The network interface 850 provides a connection interface for various networked devices. The storage interface 860 provides a connection interface for an external storage device such as a floppy disk, a USB flash drive or an SD card.

Various aspects of the present disclosure are described herein with reference to flowcharts and/or block diagrams of methods, devices and computer program products according to embodiments of the present disclosure. It should be understood that each block of the flowchart and/or block diagram, and combinations of blocks, can be implemented by computer-readable program instructions.

These computer-readable program instructions may be provided to a processor of a general-purpose computer, special-purpose computer or other programmable apparatus to produce a machine, such that the instructions, when executed through the processor, produce a device which implements functions specified in the flowchart and/or block diagram block or blocks.

These computer-readable program instructions may also be stored in a computer-readable memory that cause a computer to function in a particular manner to produce an article of manufacture, including instructions that implement the functions specified in the flowchart and/or block diagram block or blocks.

The present disclosure may take the form of an entirely hardware embodiment, an entirely software embodiment or an embodiment combining software and hardware aspects.

Through the thermal management pipeline system for a vehicle, thermal management control method, device and vehicle in the embodiments, energy utilization rate of the whole vehicle can be improved, and the pipeline design thereof is more efficient and convenient than that of a distributed heat management system.

So far, the thermal management pipeline system for a vehicle, thermal management control method, device and vehicle according to the present disclosure have been described in detail. In order to avoid obscuring the concepts of the present disclosure, some details that are commonly known in the art have not been described. Those skilled in the art can fully understand how to implement the technical solutions disclosed here according to the above description.

What is claimed is:

1. A thermal management pipeline system for a vehicle, comprising:

a first refrigerant circulating pipeline configured for cooling or heating a driver cab of the vehicle in a thermal management mode for the driver cab;

a second refrigerant circulating pipeline configured for cooling or heating a battery of the vehicle by using cooling capacity or heat obtained from the first refrigerant circulating pipeline in a thermal management mode for the battery, and further configured for heating the battery of the vehicle by using a refrigerant flowing into the second refrigerant circulating pipeline from a third refrigerant circulating pipeline in a thermal management mode for waste heat utilization; and the third refrigerant circulating pipeline configured for cooling an electric drive system of the vehicle in a thermal management mode for the electric drive system, wherein:

the thermal management mode for the driver cab comprises a cooling mode for the driver cab and a heating mode for the driver cab, the first refrigerant circulating pipeline comprises: a first three-way valve and a second three-way valve, configured to be set to a first open state to communicate with a cooling pipeline in the first refrigerant circulating pipeline in the cooling mode for the driver cab, and further configured to be set to a second open state to communicate with a heating pipeline in the first refrigerant circulating pipeline in the heating mode for the driver cab; and wherein the cooling pipeline in the first refrigerant circulating pipeline comprises:

a first sub-pipeline comprising a compressor, the second three-way valve, a first heat exchanger, the first three-way valve, a regenerator, a first electronic expansion valve, a third electromagnetic valve, a cold air core, and a gas-liquid separator which are connected sequentially, wherein the gas-liquid separator is further connected to the compressor; and a second sub-pipeline comprising the first three-way valve, a second electronic expansion valve, the regenerator and the compressor which are connected sequentially, wherein the first electronic expansion valve and the second electronic expansion valve are in a throttling state in the cooling mode for the driver cab, and the third electromagnetic valve is in an open state in the cooling mode for the driver cab.

2. The thermal management pipeline system for the vehicle according to claim 1, wherein the heating pipeline in the first refrigerant circulating pipeline comprises:

a third sub-pipeline comprising the compressor, the second three-way valve, a hot air core, a first electromagnetic valve, the regenerator, the first electronic expansion valve, the first three-way valve, a first heat exchanger, a second electromagnetic valve, and a gas-liquid separator which are connected sequentially; and a fourth sub-pipeline comprising the first electromagnetic valve, a second electronic expansion valve, the regenerator and the compressor which are connected sequentially, wherein the first electromagnetic valve and the second electromagnetic valve are in an open state in the heating mode for the driver cab, and the first electronic expansion valve and the second electronic expansion valve are in a throttling state in the heating mode for the driver cab.

3. The thermal management pipeline system for the vehicle according to claim 1, wherein the thermal management mode for the battery comprises a cooling mode for the battery and a heating mode for the battery, and the second refrigerant circulating pipeline comprises:

a second heat exchanger connected to the cooling pipeline of the first refrigerant circulating pipeline through a first branch, and connected to the heating pipeline of the first refrigerant circulating pipeline through a second branch, configured for transferring cooling capacity in the cooling pipeline to the second refrigerant circulating pipeline to cool the battery in the cooling mode for the battery, and further configured for transferring heat in the heating pipeline to the second refrigerant circulating pipeline to heat the battery in the heating mode for the battery.

4. The thermal management pipeline system for the vehicle according to claim 3, wherein:

the first branch comprises a third electronic expansion valve and a fourth electromagnetic valve;

the third electronic expansion valve has a first end connected to a cold air core, and the third electronic expansion valve has a second end connected to the second heat exchanger, wherein the third electronic expansion valve is in a throttling state in the cooling mode for the battery; and the fourth electromagnetic valve has a first end connected to the cold air core, and the fourth electromagnetic valve has a second end connected to the second heat exchanger, wherein the fourth electromagnetic valve is in an open state in the cooling mode for the battery.

5. The thermal management pipeline system for the vehicle according to claim 3, wherein the second branch comprises a first connecting pipeline arranged between the second three-way valve and the second heat exchanger.

6. The thermal management pipeline system for the vehicle according to claim 5, wherein:

the second branch further comprises a second connecting pipeline arranged between the second heat exchanger and a hot air core; and the second connecting pipeline comprises a third electronic expansion valve and a fifth electromagnetic valve, wherein the third electronic expansion valve is in a throttling state in the heating mode for the battery, and the fifth electromagnetic valve is in an open state in the heating mode for the battery.

7. The thermal management pipeline system for the vehicle according to claim 3, wherein the second refrigerant circulating pipeline further comprises:

a first water pump;

an electric heater; and a third three-way valve, configured to be set to a third open state in the thermal management mode for waste heat utilization, to make the second refrigerant circulating pipeline communicate with the third refrigerant circulating pipeline and heat the battery by using the refrigerant in the third refrigerant circulating pipeline, and further configured to be set to a fourth open state to make the second refrigerant circulating pipeline not communicate with the third refrigerant circulating pipeline in the thermal management mode for the battery.

8. The thermal management pipeline system for the vehicle according to claim 1, wherein the refrigerant in the first refrigerant circulating pipeline is a carbon dioxide refrigerant.

9. The thermal management pipeline system for the vehicle according to claim 1, wherein the refrigerant in the second refrigerant circulating pipeline and the third refrigerant circulating pipeline is a glycol solution.

10. A thermal management control method for a vehicle, applied to the thermal management pipeline system for the vehicle according to claim 1, comprising:

determining a component to be controlled of at least one of the first to third refrigerant circulating pipelines in the thermal management pipeline system for the vehicle, according to the thermal management mode for the vehicle, wherein the component comprises the first three-way valve and the second three-way valve; and sending a control signal to the component to be controlled of the at least one of the first to third refrigerant circulating pipelines to switch the at least one of the first to third refrigerant circulating pipelines to a state corresponding to the thermal management mode.

11. A thermal management control device for a vehicle, applied to the thermal management pipeline system for the vehicle according to claim 1, comprising:

a determining module configured for determining a component to be controlled of at least one of the first to third refrigerant circulating pipelines in the thermal management pipeline system for the vehicle, according to the thermal management mode for the vehicle, wherein the component comprises the first three-way valve and the second three-way valve; and a sending module configured for sending a control signal to the component to be controlled of the at least one of the first to third refrigerant circulating pipelines to switch the at least one of the first to third refrigerant circulating pipelines to a state corresponding to the thermal management mode.

12. A vehicle, comprising:

a thermal management pipeline system for the vehicle, comprising:

a first refrigerant circulating pipeline configured for cooling or heating a driver cab of the vehicle in a thermal management mode for the driver cab;

a second refrigerant circulating pipeline configured for cooling or heating a battery of the vehicle by using cooling capacity or heat obtained from the first refrigerant circulating pipeline in a thermal management mode for the battery, and further configured for cooling the battery of the vehicle by using a refrigerant flowing into the second refrigerant circulating pipeline from a third refrigerant circulating pipeline in a thermal management mode for waste heat utilization; and the third refrigerant circulating pipeline configured for cooling an electric drive system of the vehicle in a thermal management mode for the electric drive system; and the thermal management control device for the vehicle according to claim 11.

13. A non-transitory computer-readable storage medium, on which computer program instructions are stored, and the computer program instructions, when executed by a processor, implements the thermal management control method for the vehicle according to claim 10.

14. The vehicle according to claim 12, wherein the heating pipeline in the first refrigerant circulating pipeline comprises:

a third sub-pipeline comprising a compressor, the second three-way valve, a hot air core, a first electromagnetic valve, a regenerator, a first electronic expansion valve, the first three-way valve, a first heat exchanger, a second electromagnetic valve, and a gas-liquid separator which are connected sequentially; and a fourth sub-pipeline comprising the first electromagnetic valve, a second electronic expansion valve, the regenerator and the compressor which are connected sequentially, wherein the first electromagnetic valve and the second electromagnetic valve are in an open state in the heating mode for the driver cab, and the first electronic expansion valve and the second electronic expansion valve are in a throttling state in the heating mode for the driver cab.

15. The vehicle according to claim 12, wherein the thermal management mode for the battery comprises a cooling mode for the battery and a heating mode for the battery, and the second refrigerant circulating pipeline comprises:

a second heat exchanger connected to the cooling pipeline of the first refrigerant circulating pipeline through a first branch, and connected to the heating pipeline of the first refrigerant circulating pipeline through a second branch, configured for transferring cooling capacity in the cooling pipeline to the second refrigerant circulating pipeline to cool the battery in the cooling mode for the battery, and further configured for transferring heat in the heating pipeline to the second refrigerant circulating pipeline to heat the battery in the heating mode for the battery.

16. The vehicle according to claim 15, wherein:

the first branch comprises a third electronic expansion valve and a fourth electromagnetic valve;

the third electronic expansion valve has a first end connected to a cold air core, and the third electronic expansion valve has a second end connected to the second heat exchanger, wherein the third electronic expansion valve is in a throttling state in the cooling mode for the battery; and the fourth electromagnetic valve has a first end connected to the cold air core, and the fourth electromagnetic valve has a second end connected to the second heat exchanger, wherein the fourth electromagnetic valve is in an open state in the cooling mode for the battery.

* * * * *